United States Patent [19]

Iga et al.

[11] Patent Number: 5,130,799
[45] Date of Patent: Jul. 14, 1992

[54] GHOST CANCELLING SYSTEM AND CONTROL METHOD THEREOF

[75] Inventors: Hiroyuki Iga; Hiroshi Matsue, both of Kanagawa, Japan

[73] Assignee: Kabushiki Kaisha Toshiba, Kawasaki, Japan

[21] Appl. No.: 589,506

[22] Filed: Sep. 28, 1990

[30] Foreign Application Priority Data

Sep. 28, 1989 [JP] Japan .................. 1-250458

[51] Int. Cl.⁵ .................. H04N 5/213; H04N 9/64
[52] U.S. Cl. .................. 358/167; 358/36; 358/905; 375/11
[58] Field of Search .............. 358/167, 36, 905, 21 V, 358/340, 314; 375/11, 12; 364/724.2, 724.16

[56] References Cited

U.S. PATENT DOCUMENTS

| 4,335,396 | 6/1982 | Rzeszewski | 358/905 |
| 4,575,857 | 3/1986 | Murakami | 358/905 |
| 4,897,725 | 1/1990 | Tanaka et al. | 358/167 |
| 4,947,252 | 8/1990 | Kobayashi et al. | 358/167 |

FOREIGN PATENT DOCUMENTS

0199275 10/1985 Japan .
0250782 12/1985 Japan .

Primary Examiner—John K. Peng
Attorney, Agent, or Firm—Foley & Lardner

[57] ABSTRACT

A ghost cancelling system which detects a horizontal scanning line containing the reference signals and extracts 8 fields reference signals from the horizontal scanning line. A final reference signal corresponding to the 8 fields reference signals is calculated by a specified calculation algorithm, and the system corrects the tap coefficient in response to the distinguished ghost signal using the final reference signal.

9 Claims, 9 Drawing Sheets

| FIELD NUMBER (i) | 1 | 2 | 3 | 4 | 5 | 6 | 7 | 8 |
|---|---|---|---|---|---|---|---|---|
| GCR SIGNAL WAVEFORM ($Y_i$) | $W^+$ | $O^-$ | $W^-$ | $O^+$ | $O^+$ | $W^-$ | $O^-$ | $W^+$ |
| {a} $[Y_i - Y_{i+4}]$ | $+W$ | $-W \rightarrow Y_2-Y_6$ | $+W \rightarrow Y_3-Y_7$ | $-W \rightarrow Y_4-Y_8$ | $-W \rightarrow Y_5-Y_9$ | $+W \rightarrow Y_6-Y_{10}$ | $-W \rightarrow Y_7-Y_{11}$ | $+W \rightarrow Y_8-Y_{12}$ |
| $[Y_{i+5}-Y_{i+1}]$ | $+W \rightarrow Y_6-Y_2$ | $-W \rightarrow Y_7-Y_3$ | $+W \rightarrow Y_8-Y_4$ | $-W \rightarrow Y_9-Y_5$ | $-W \rightarrow Y_{10}-Y_6$ | $+W \rightarrow Y_{11}-Y_7$ | $-W \rightarrow Y_{12}-Y_8$ | $+W \rightarrow Y_{13}-Y_9$ |
| {b} $[Y_{i+2}-Y_{i+6}]$ | $+W \rightarrow Y_3-Y_7$ | $-W \rightarrow Y_4-Y_8$ | $-W \rightarrow Y_5-Y_9$ | $+W \rightarrow Y_6-Y_{10}$ | $-W \rightarrow Y_7-Y_{11}$ | $+W \rightarrow Y_8-Y_{12}$ | $+W \rightarrow Y_9-Y_{13}$ | $-W \rightarrow Y_{10}-Y_{14}$ |
| $[Y_{i+7}-Y_{i+3}]$ | $+W \rightarrow Y_8-Y_4$ | $+W \rightarrow Y_9-Y_5$ | $-W \rightarrow Y_{10}-Y_6$ | $+W \rightarrow Y_{11}-Y_7$ | $-W \rightarrow Y_{12}-Y_8$ | $-W \rightarrow Y_{13}-Y_9$ | $+W \rightarrow Y_{14}-Y_{10}$ | $-W \rightarrow Y_{15}-Y_{11}$ |
| $\alpha$ | $4W$ | | 0 | | $-4W$ | | 0 | |
| $\beta$ | 0 | | $4W$ | | 0 | | $-4W$ | |

| FIELD NUMBER (i) | 9 | 10 | 11 | 12 | 13 | 14 | 15 | 16 |
|---|---|---|---|---|---|---|---|---|
| GCR SIGNAL WAVEFORM ($Y_i$) | $W^+$ | $O^-$ | $W^-$ | $O^+$ | $O^+$ | $W^-$ | $O^-$ | $W^+$ |

| FIELD NUMBER (i) | 1 | 2 | 3 | 4 | 5 | 6 | 7 | 8 |
|---|---|---|---|---|---|---|---|---|
| GCR SIGNAL WAVEFORM ($Y_i$) | $W^+$ | $0^-$ | $W^-$ | $0^+$ | $0^+$ | $W^-$ | $0^-$ | $W^+$ |
| (a) $[Y_i - Y_{i+4}]$ | $+W \rightarrow Y_1 - Y_5$ | $-W \rightarrow Y_2 - Y_6$ | $+W \rightarrow Y_3 - Y_7$ | $-W \rightarrow Y_4 - Y_8$ | $-W \rightarrow Y_5 - Y_9$ | $+W \rightarrow Y_6 - Y_{10}$ | $-W \rightarrow Y_7 - Y_{11}$ | $+W \rightarrow Y_8 - Y_{12}$ |
| (a) $[Y_{i+3} - Y_{i+7}]$ | $-W \rightarrow Y_4 - Y_8$ | $+W \rightarrow Y_5 - Y_9$ | $-W \rightarrow Y_6 - Y_{10}$ | $+W \rightarrow Y_7 - Y_{11}$ | $+W \rightarrow Y_8 - Y_{12}$ | $-W \rightarrow Y_9 - Y_{13}$ | $-W \rightarrow Y_{10} - Y_{14}$ | $+W \rightarrow Y_{11} - Y_{15}$ |
| (b) $[Y_{i+2} - Y_{i+6}]$ | $+W \rightarrow Y_3 - Y_7$ | $-W \rightarrow Y_4 - Y_8$ | $+W \rightarrow Y_5 - Y_9$ | $+W \rightarrow Y_6 - Y_{10}$ | $-W \rightarrow Y_7 - Y_{11}$ | $+W \rightarrow Y_8 - Y_{12}$ | $-W \rightarrow Y_9 - Y_{13}$ | $-W \rightarrow Y_{10} - Y_{14}$ |
| (b) $[Y_{i+5} - Y_{i+1}]$ | $+W \rightarrow Y_6 - Y_2$ | $+W \rightarrow Y_7 - Y_3$ | $+W \rightarrow Y_8 - Y_4$ | $+W \rightarrow Y_9 - Y_5$ | $-W \rightarrow Y_{10} - Y_6$ | $+W \rightarrow Y_{11} - Y_7$ | $-W \rightarrow Y_{12} - Y_8$ | $-W \rightarrow Y_{13} - Y_9$ |
| $\alpha$ | | $\alpha = -4W$ | | $\alpha = 0$ | | $\alpha = 4W$ | | $\alpha = 0$ |
| $\beta$ | | $\beta = 0$ | | $\beta = -4W$ | | $\beta = 0$ | | $\beta = 4W$ |

| FIELD NUMBER (i) | 9 | 10 | 11 | 12 | 13 | 14 | 15 | 16 |
|---|---|---|---|---|---|---|---|---|
| GCR SIGNAL WAVEFORM ($Y_i$) | $W^+$ | $0^-$ | $W^-$ | $0^+$ | $0^+$ | $W^-$ | $0^-$ | $W^+$ |

FIG. 9.

GHOST CANCELLING SYSTEM AND CONTROL METHOD THEREOF

BACKGROUND OF THE INVENTION

1. Field of the Invention

The present invention relates, in general, to a ghost cancelling system, and more particularly to a ghost cancelling system for cancelling ghost signals from a video signal using a reference signal of the 8-field sequence type.

2. Description of the Related Art

In recent years, use of a ghost cancel reference (hereafter, GCR) signal for cancelling ghost signals contained in a video signal has become standard in television broadcasting systems. For example, this new GCR method has been adopted as Japan's standard for broadcasting and was introduced in the fall of 1989. The details of GCR signals are given in "Development of a Ghost Cancel Reference Signal for TV Broadcasting", IEEE Trans. on Broadcasting, Vol. 35, No. 4, Dec. 1989, by Miyazawa, Matsuura, Takayama and Usui (hereafter, Ref. 1) which is incorporated herein by reference. The GCR signal described in this Ref. 1 is known as an 8-field sequence type GCR signal. In this system, the ghost signal is cancelled with the aid of a GCR signal inserted with a period of 8 fields in the 18th horizontal scanning line (18H) of the odd numbered fields and the 281st horizontal scanning line (281H) of the even numbered fields. Further, the ghost signal is detected using the finally calculated GCR signal ($S_{GCR}$) that is obtained by performing the 8-field sequence calculation indicated by the following equation (1).

$$S_{GCR} = (S_1 - S_5) + (S_6 - S_2) + (S_3 - S_7) + (S_8 - S_4) \quad (1)$$

This operation is performed in order to remove the ghost effect of the horizontal scanning line signal previous to the horizontal scanning line in which the GCR signal is inserted, and the horizontal synchronization signal and color burst signal of the horizontal scanning line in which the GCR signal is inserted.

As an example, a conventional ghost cancelling system using a GCR signal of the 8-field sequence type is described in Japanese Patent Disclosure (Kokai) No. 59-211315. In the conventional ghost cancelling system, in order to extract the GCR signals ($S_1$)–($S_8$) corresponding to eight fields, it is necessary to detect the first GCR signal ($S_1$) itself. However, with such a system, the construction of an $S_1$ line detector which detects the arrival of the first GCR signal ($S_1$) is complicated. This is because, in order to detect the first GCR signal ($S_1$) itself, the following three conditions must all be fulfilled.

| | |
| --- | --- |
| condition 1: | the horizontal scanning line is the 18H horizontal scanning line; |
| condition 2: | the GCR signal is a signal of waveform that rises steeply from black to white, then falls smoothly from white to black (hereafter, WRB (Wide Reverse Bar) waveform signal). |
| condition 3: | the phase of the color burst signal is positive polarity (+). |

Here, condition 1 can be detected using an ordinary line detection technique. In contrast, detection of conditions 2 and 3 requires complicated processing to ascertain the shapes of the respective waveforms and determine their phase. Therefore, this requirement to detect conditions 2 and 3 made the construction of the conventional $S_1$ line detection means complicated, making the system costly.

SUMMARY OF THE INVENTION

Accordingly, it is an object of the present invention to provide an improved ghost cancelling system in which waveform extraction can be performed by line detection, without using complex-structured waveform detection or phase detection.

It is a further object of the present invention to provide a ghost cancelling system which can eliminate the increased system costs resulting from complexity of the structure for waveform extraction.

In accordance with the present invention, the foregoing objects are achieved by providing a ghost cancelling system including a transversal filter having a plurality of taps which coefficients are adjustable memory, wherein the tapped delay lines operate as an input portion of the transversal filter and delay the input signal by a specified delay time. A line detector device detects a horizontal scanning line in which the reference signal is inserted from the signal of the input portion or the output portion of the transversal filter. A reference signal extractor extracts the reference signal over 8 fields, starting with the horizontal scanning line which is detected by the line detector device. A reference signal calculator finds a final reference signal corresponding to the 8 field reference signals which are extracted by the reference signal extractor, using a specified calculation algorithm. A ghost detection device detects the ghost signal using the final reference signal calculated by the reference signal calculator device. A tap coefficient calculation device calculates the tap coefficient of the transversal filter using the detection output of the ghost detection device.

BRIEF DESCRIPTION OF THE DRAWINGS

These and other objects and advantages of this invention will become more apparent from the following detailed description of the presently preferred embodiment of the invention, taken in conjuction with the accompanying drawings of which.

DETAILED DESCRIPTION OF THE PREFERRED EMBODIMENT

The preferred embodiment of the present invention will now be described in more detail with reference to the accompanying drawings.

Figure 1:
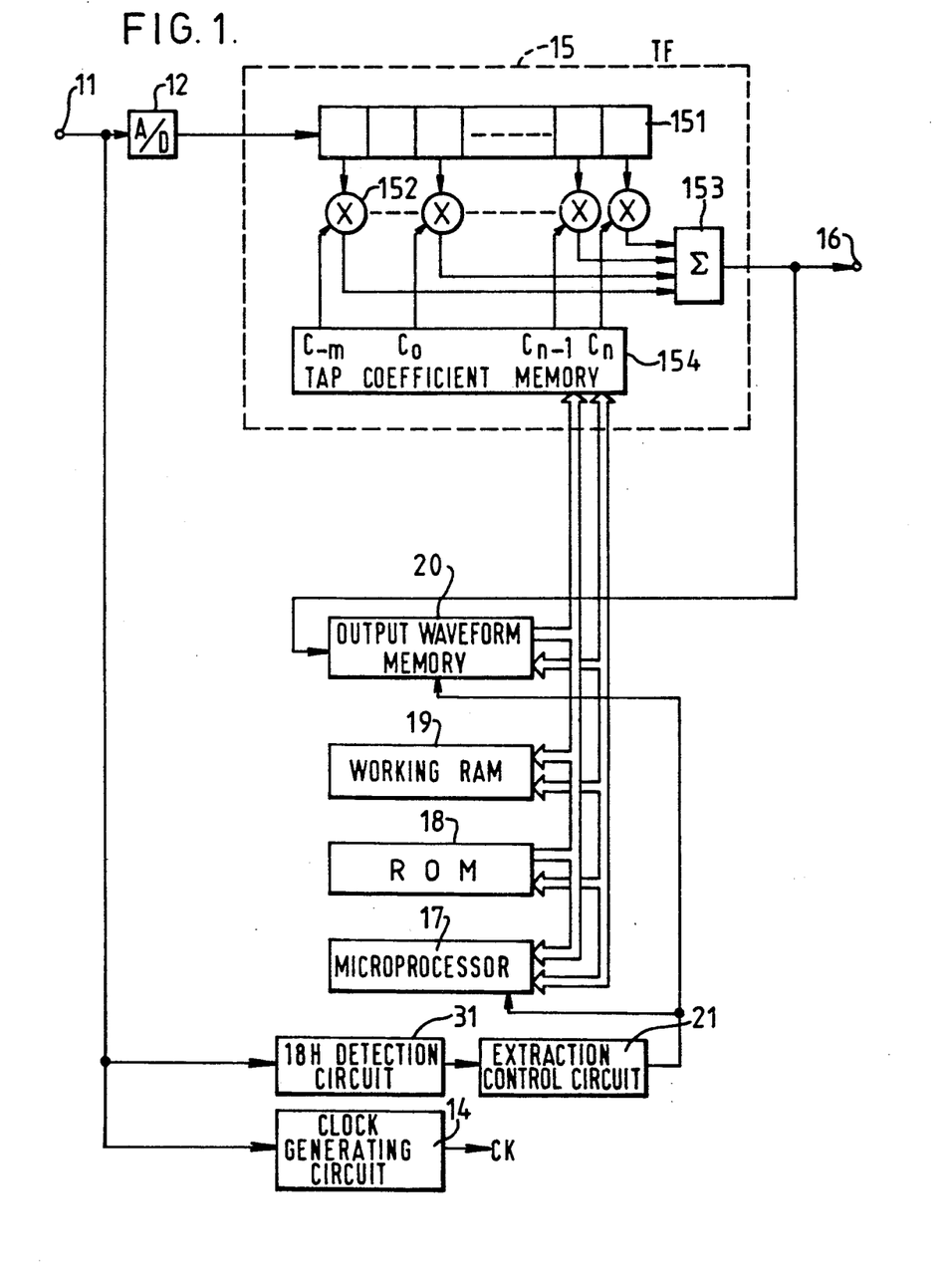
FIG. 1 is a basic block diagram of the ghost cancelling system according to the present invention.

In an exemplary embodiment of the present invention, as illustrated in FIG. 1, there is provided a ghost cancelling system. The ghost cancelling system includes a transversal filter (hereafter, TF) 15, an analogue/digital conversion circuit (hereafter, A/D conversion circuit) 12, a microprocessor 17, ROM 18, RAM 19 and an output waveform memory 20. ROM 18 is a memory element that stores the control program of microprocessor 17. RAM 19 is a memory element that is used as working memory. The output waveform memory 20 is used for writing the ghost cancelling output waveform in real time. The TF 15 includes a plurality of tapped delay lines 151, coefficient circuits 152 corresponding to the tapped delay lines 151, an adder 153 and a tap coefficient memory 154.

The video signal containing the GCR signal is supplied through an input terminal 11 to the A/D conversion circuit 12, an 18H detection circuit 31 and a clock generating circuit 14. The digital video signal that is output from the A/D conversion circuit 12, which is operated by clock CK of period T is input to the TF 15 in order for the ghost signal to be cancelled from the video signal. The video signal that is input to the TF 15 is sequentially delayed with period T by the tapped delay lines 151. Each of the outputs of this tapped delay lines 151 is multiplied by a tap coefficient $C_{-m} - C_n$ by a respective corresponding coefficient circuits 152. Then the results are added by the adder 153. This added output is supplied to an output terminal 16 and the output waveform memory 20 as the output of TF 15. A clock generating circuit 14 generates a clock CK of the necessary period T for this system (e.g., T=about 70 ns=$\frac{1}{4}$ $f_{sc}$, $f_{sc}$=3.57954 MHz=chrominance sub-carrier frequency).

The 18H detection circuit 31 detects the 18-th horizontal scanning line (18H). On receiving this detection result, an extraction control circuit 21 instructs the microprocessor 17 and the output waveform memory 20 to perform waveform extraction to extract GCR signals for 8 fields continuously, starting with 18H.

Figure 2:
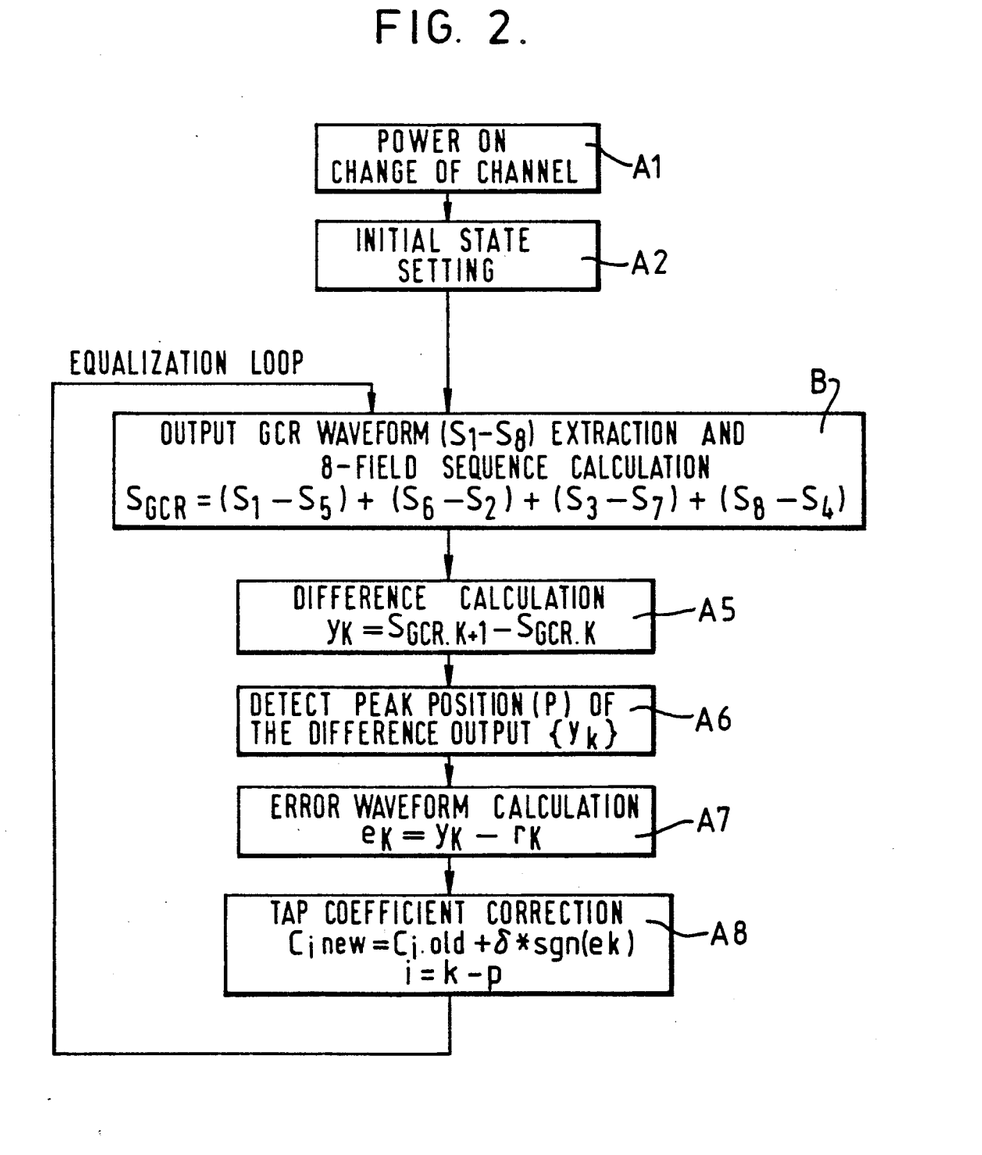
FIG. 2 is a flow-chart showing the operating sequence of the ghost cancelling system shown in FIG. 1.

The operating sequence of this system is shown in FIG. 2. A basic description of the steps in FIG. 2 except for step B, in which the GCR signal is extracted from the ghost cancelling signal and the 8-field sequence calculation is carried out, is given in "Ghost Clean System", IEEE Trans. on CE, Vol. CE-29, No. 3, Aug. 1983, by Murakami, Iga and Takehara (hereafter, Ref. 2).

Figure 3:
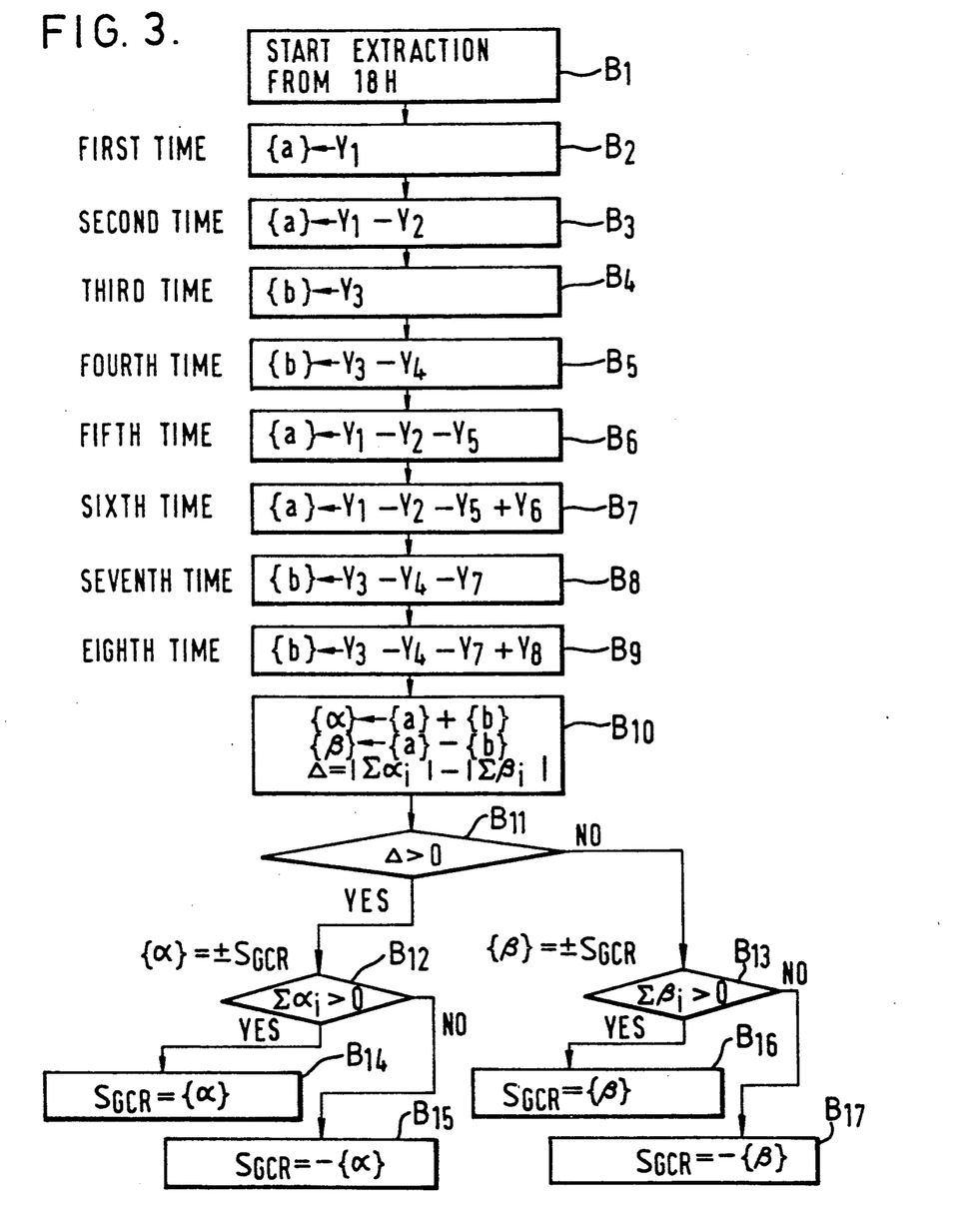
FIG. 3 is a detailed flow-chart showing the operating sequence of output GCR waveform extraction and 8-field sequence calculation step shown in FIG. 2.

First of all, on power-up or when the channel is changed (step A1), initial state setting processing such as resetting to zero the tap coefficients $C_{-m} - C_n$ that are latched in the tap coefficient memory 154 of the TF 15 is performed (step A2). After this, the equalization loop indicated in steps B-A8 is executed. The details of step B are shown in FIG. 3. In step B1, the extraction of GCR signals for 8 fields continuously starts from 18H. The microprocessor 17 finds the final GCR signal ($S_{GCR}$) by executing the processing from steps B2 to B17 of FIG. 3. This processing for finging the final GCR signal ($S_{GCR}$) is described below.

Figure 4:
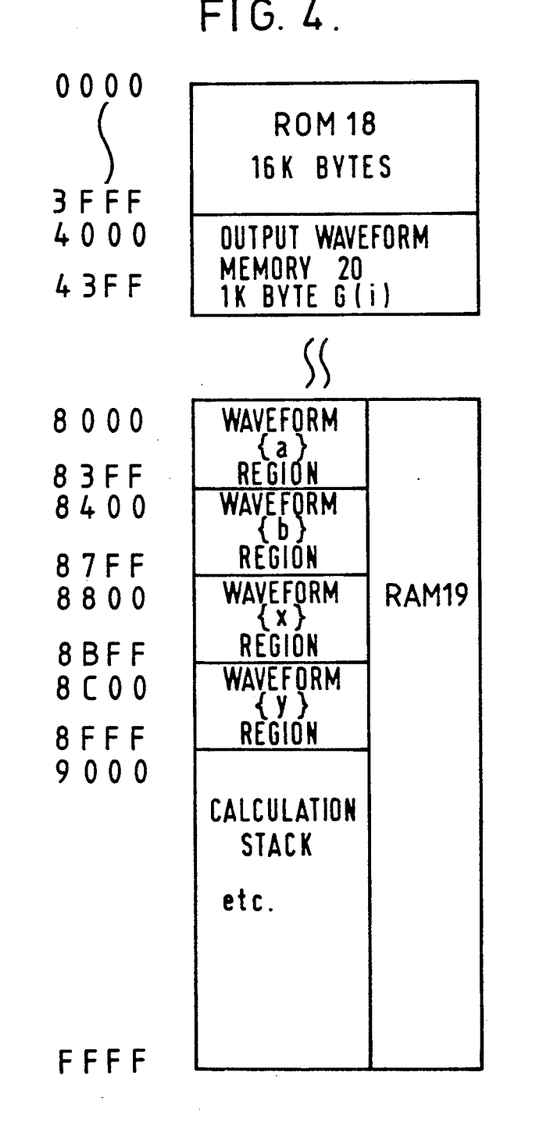
FIG. 4 is a view showing a memory map of FIG. 1.

First of all, the GCR signal (WRB waveform signal or black flat waveform signal) $Y_1$ obtained by the first extraction is extracted into the output waveform memory 20, then stored in a waveform region {a} of the working RAM 19 (step B2). The address of a waveform region {a} is shown in the memory map of FIG. 4. In step B3, the GCR signal $Y_2$ obtained by the second extraction is extracted into the output waveform memory 20, then subtracted from the contents of waveform region {a}. The result of this subtraction ($Y_1 - Y_2$) is stored in the waveform region {a}. In the next step, B4, the GCR signal $Y_3$ obtained by the third extraction is extracted into the output waveform memory 20, then stored in a waveform region {b} of the working RAM 19. The address of the waveform region {b} is shown in the memory map of FIG. 4. In step B5, the GCR signal $Y_4$ obtained by the fourth extraction is extracted into the output waveform memory 20, then subtracted from the contents of the waveform region {b}. The result of this subtraction ($Y_3 - Y_4$) is stored in the waveform region {b}. In step B6, the GCR signal $Y_5$ obtained by the fifth extraction is extracted into the output waveform memory 20, then subtracted from the contents of the waveform region {a}. The result of this subtraction ($Y_1 - Y_2 - Y_5$) is stored in the waveform region {a}. In the following step, B7, the GCR signal $Y_6$ obtained by the sixth extraction is extracted into the output waveform memory 20, then added to the contents of the waveform region {a}. The result of this addition ($Y_1 - Y_2 - Y_5 + Y_6$) is stored in the waveform region {a}. In step B8, the GCR signal $Y_7$ obtained by the seventh extraction is extracted into the output waveform memory 20, then subtracted from the contents of the waveform region {b}. The result of this subtraction ($Y_3 - Y_4 - Y_7$) is stored in the waveform region {b}. In next step B9, the GCR signal $Y_8$ obtained by the eighth extraction is extracted into the output waveform memory 20, then added to the contents of the waveform region {b}. The result of this addition ($Y_3 - Y_4 - Y_7 + Y_8$) is stored in the waveform region {b}.

As a result, the contents indicated by equations (2) and (3) below, respectively, are stored in the waveform regions {a} and {b}.

$$\{a\} = (Y_1 - Y_5) + (Y_6 - Y_2) \tag{2}$$

$$\{b\} = (Y_3 - Y_7) + (Y_8 - Y_4) \tag{3}$$

Next, in step B10, addition result {α} and subtraction result {β} are found by adding and subtracting the contents of the waveform regions {a} and {b}, as shown by equations (4) and (5) below. After this, as shown by equation (6) below, the difference Δ of the absolute values $|\rho\alpha i|$, $|\mu\rho i|$ of the respective sample values is found.

$$\{\alpha\} = \{a\} + \{b\} \tag{4}$$

$$\{\beta\} = \{a\} - \{b\} \tag{5}$$

$$\Delta = |\rho\alpha i| - |\rho\beta i| \tag{6}$$

Here, the addition result {α} and the subtraction result {β} represent the positive polarity final GCR signal ($S_{GCR}$) or the negative polarity final GCR signal ($S_{GCR}$) This will be explained using FIG. 5.

Figure 5:
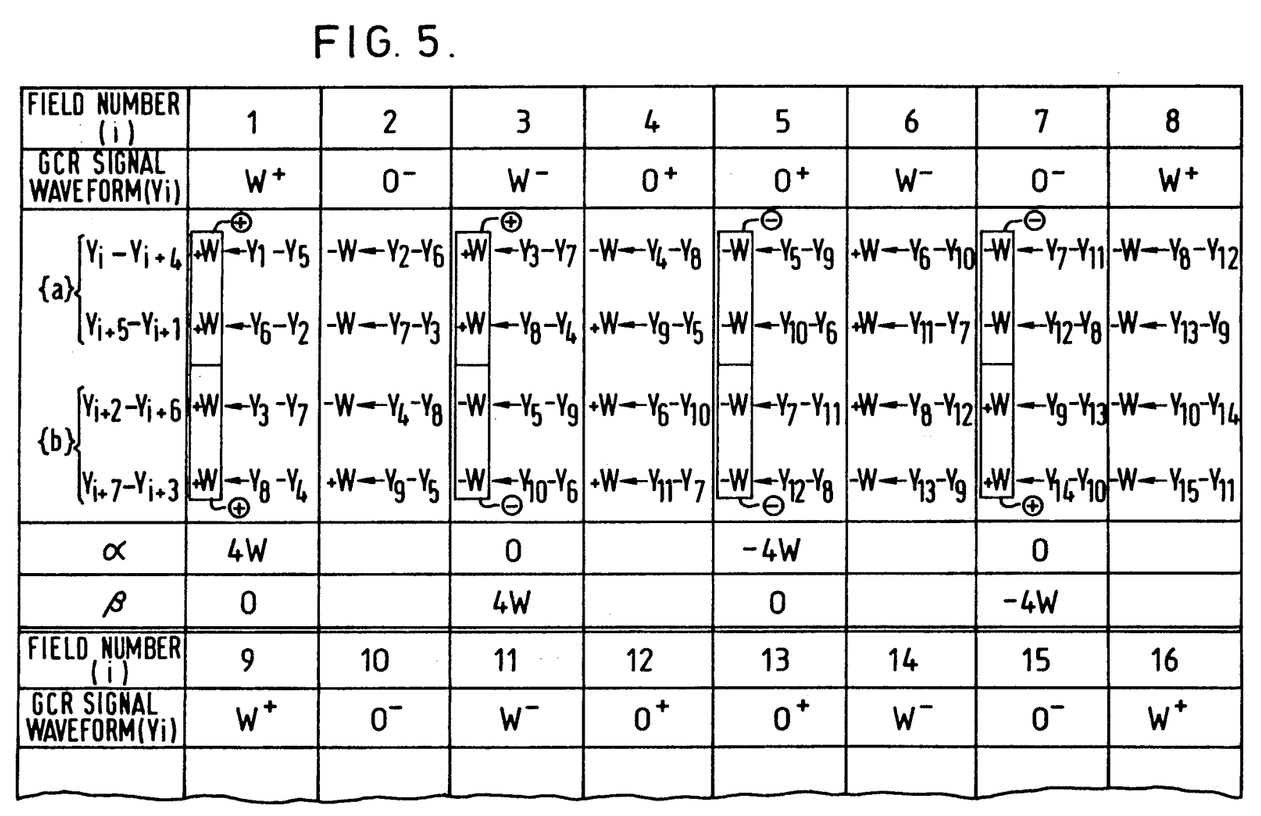
FIG. 5 is a view given in explanation of the operation or FIG. 1.

In FIG. 5, regarding the field number (i), numbers 1 to 8 are the same as those shown in Ref. 1. Further numbers are directly increased in sequence without repeated numbers. The GCR signal waveform is the same as that of Ref. 1 except that GCR$^\pm$ of Ref. 1 is called W$^\pm$. FIG. 5 shows the results of calculating $$Y_i - Y_{i+4} \qquad (7)$$

$$Y_{i+5} - Y_{i+1} \qquad (8)$$

$$Y_{i+2} - Y_{i+6} \qquad (9)$$

$$Y_{i+7} - Y_{i+3} \qquad (10)$$

for each field (i). In the calculated results, W and $-$W respectively indicate positive polarity and negative polarity WRB waveform signals. With this representation, it can be seen that the only combinations of the waveform regions $\{a\}$ and $\{b\}$ of odd fields (1,3,5,7, ...) are: (+2W, +2W), (+2W, $-$2W), ($-$2W, $-$2W) and ($-$2W, +2W). As shown by equations (4) and (5), one of the addition result $\{\alpha\}$ and subtraction result $\{\beta\}$ of the waveforms $\{a\}$ and $\{b\}$ will therefore be $\pm$4W ($= \pm S_{GCR}$), while the other is 0. Here, +4W indicates a positive polarity final GCR signal ($S_{GCR}$), and $-$4W indicates a negative polarity final GCR signal ($S_{GCR}$) Equation (6) is a calculation formula used to decide whether the addition result $\{\alpha\}$ is $\pm$4W or the subtraction result $\{\beta\}$ is $\pm$4W. In step B11, the microprocessor 17 uses this calculation result $\Delta$ to decide whether the addition result $\{\alpha\beta\}$ is $\pm$4W or the subtraction result $\{\beta\}$ is $\pm$4W. That is, if $\Delta > 0$ ($\Delta = +$4W), it decides that the addition result $\{\alpha\}$ is $\pm$4W, while if $\Delta > 0$ ($\Delta = -$4W), it decides that the subtraction result $\{\beta\}$ is $\pm$4W. Next, if $\Delta > 0$, in step B12, the microprocessor 17 decides whether $\rho\alpha i$ is positive or not. If it is positive, it takes $\{\alpha\}$ as $S_{GCR}$ (step B14). If it is not positive, it takes $-\{\alpha\}$ as $S_{GCR}$ (step B13). In the same way, if $\Delta > 0$, in step B13, it decides whether $\rho\beta i$ is positive or not. If it is positive, it takes $\{\beta\}$ as $S_{GCR}$ (step B16). If it is not positive, it takes $-\{\beta\}$ as $S_{GCR}$ (step B17). In general, the final GCR signal ($S_{GCR}$) is constituted by 1k words (1 word = 8 bytes), and is expressed as a sample value by the following equation:

$$S_{GCR} = \{S_{GCR}\}(k=0-1023) \qquad (11)$$

Next, in step A5, the microprocessor 17 calculate the difference signals $\{y_k\}$ defined by equation (12) below and stores them in working RAM 19.

$$y_k = S_{GCR+1} - S_{GCRk} \qquad (12)$$

In step A6, the microprocessor 17 detects the position of the maximum peak of the difference waveform signals $\{y_k\}$ of the output. The position of this peak is denoted by p. That is, $y_p$ is the peak of the impulse of the main signal. In next step A7, after effecting alignment at peak position (p), the microprocessor 17 finds an error waveform signal $\{e_k\}$ by subtracting from the difference waveform signal $\{y_k\}$ of the output a reference waveform signal $\{r_k\}$ that is stored beforehand in ROM 18, and stores this error waveform signal in working RAM 19. This calculation is shown by the following equation (13).

$$e_k = y_k - r_k \qquad (13)$$

In step A8, the tap coefficient is corrected based on the Incremental Control method shown in equation (14) below.

$$C_{inew} = C_{iold} + \delta * sgn(e_k) \qquad (14)$$

Here, $i = k - p$, $i = -m$ to $n$

Here, the suffix i of the tap coefficient ($C_i$) indicates the tap for cancelling the ghost of delay time iT seconds, and new and old indicate "before correction" and "after correction", respectively. And $\delta$ is a positive minute correction.

The ghost signal is cancelled from the video signal by repeated execution of the equalization loop consisting of the above sequence of operations (steps B-A8).

Accordingly, with this system, even if the leading GCR signal is not the first GCR signal ($S_1$) of the 8-field sequence, the final GCR signal ($S_{GCR}$) can still be found if simply the system is satisfied that it is the 18H GCR signal. For extraction of the GCR signal, it is therefore only necessary to detect 18H. This enables the extraction construction to be simplified. Furthermore, the computation algorithm of FIG. 3 can be performed by software of the microprocessor 17, so the hardware is not made more complex in any way at all.

Figure 6:
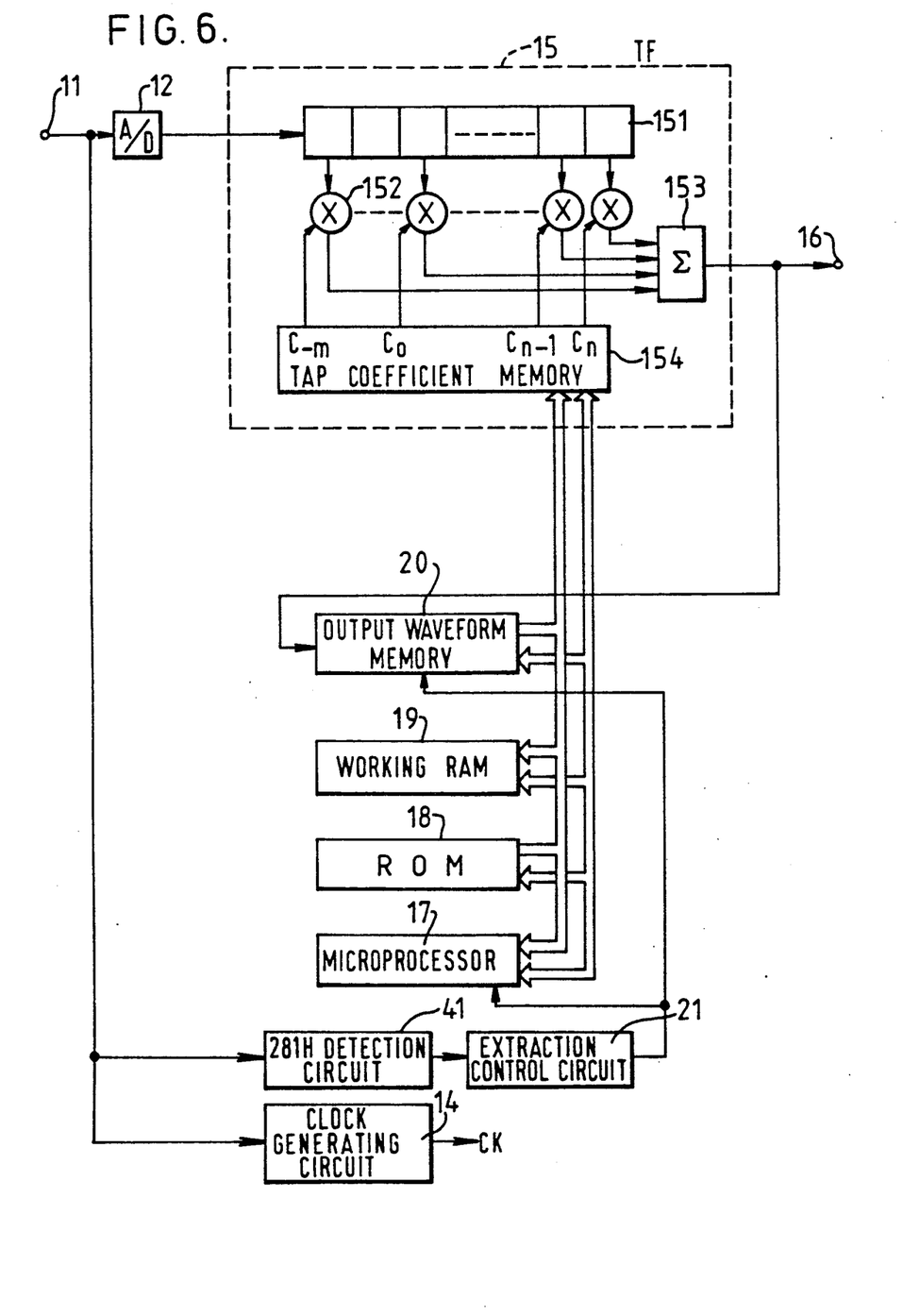
FIG. 6 is a basic block diagram of the ghost cancelling system of a second embodiment of the invention.
Figure 7:
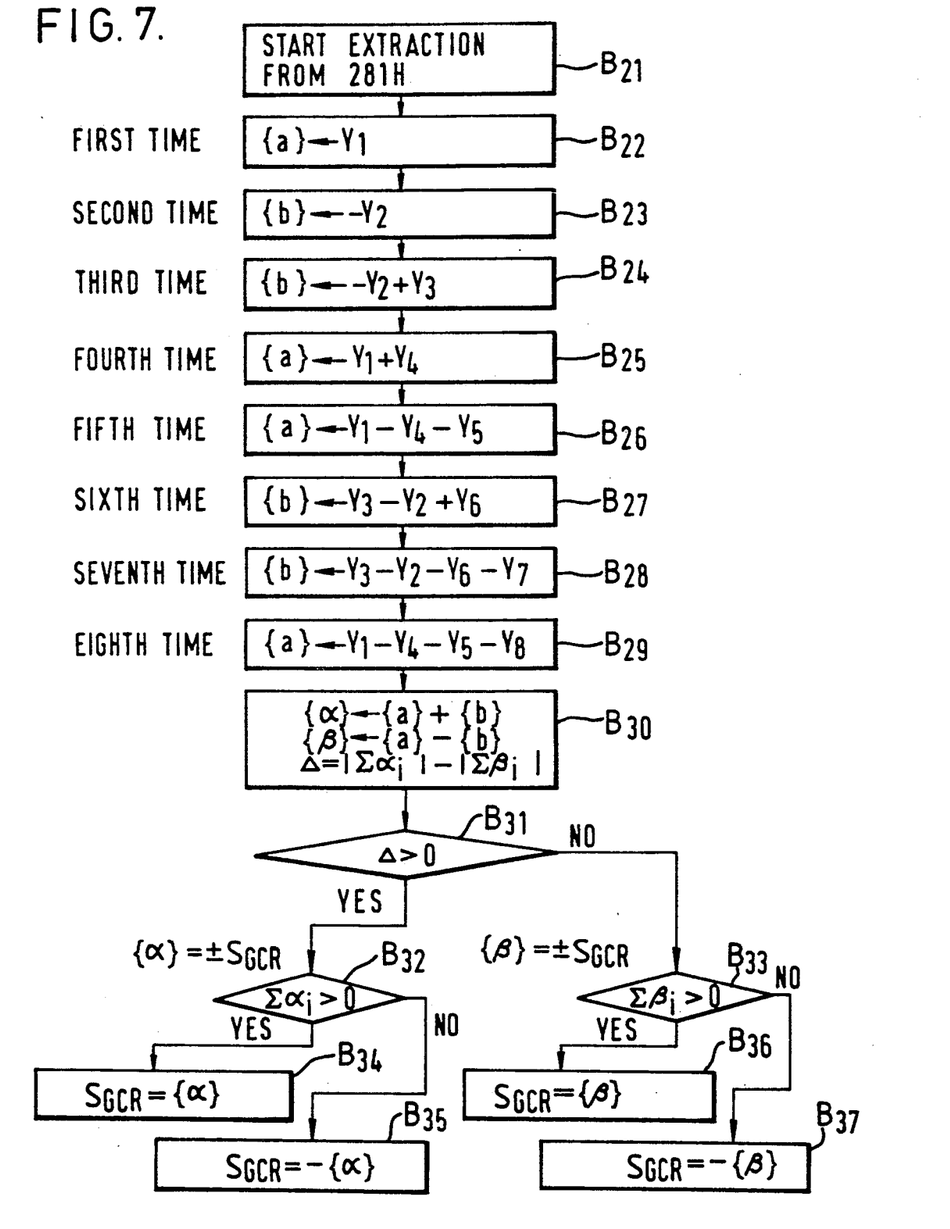
FIG. 7 is a detailed flow-chart showing the operating sequence of output GCR waveform extraction and 8-field sequence calculation step of a second embodiment of the invention.

FIG. 6 is a block diagram showing the layout of a second embodiment of the present invention. FIG. 7 is a flow chart showing the calculation algorithm for finding the final GCR signal ($S_{GCR}$). Items in FIG. 6 and FIG. 7 which are the same as the corresponding items in FIG. 1 and FIG. 3 above are given the same reference numerals and a detailed description is omitted. The difference between FIG. 6 and FIG. 1 described above is that a 281H detection circuit 41 is provided instead of the 18H detection circuit 31 and that a different control program is stored in ROM 18. The characteristic parts of the control program are shown in FIG. 7.

In FIG. 6, the 281H detection circuit 41 detects 281H in each frame. On receiving this detection result, the extraction control circuit 21 instructs the microprocessor 17 and the output waveform memory 20 to perform waveform extraction to extract GCR signals for 8 fields continuously, starting with 281H. This processing is shown in step B21 of FIG. 7. After this, the microprocessor 17 finds the final GCR signal ($S_{GCR}$) by executing the processing from steps B22 to B37 of FIG. 7. This processing for finding the final GCR signal (SGCR) is described below.

First of all, in step B22, the GCR signal (WRB waveform signal or black flat waveform signal) $Y_1$ obtained by the first extraction is extracted into the output waveform memory 20, then stored in a waveform region $\{a\}$ of the working RAM 19. In step B23, the GCR signal $Y_2$ obtained by the second extraction is extracted into the output waveform memory 20, then stored in waveform region $\{b\}$ in an inverted polarity condition. Next, in step B24, the GCR signal $Y_3$ obtained by the third extraction is extracted into the output waveform memory 20, then added to the contents of waveform region $\{b\}$ and stored in waveform region $\{b\}$. In step B25, the GCR signal $Y_4$ obtained by the fourth extraction is extracted into the output waveform memory 20, then added to the contents of waveform region $\{a\}$ and stored in waveform region $\{a\}$. In step B26, the GCR signal $Y_5$ obtained by the fifth extraction is extracted into the output waveform memory 20, then subtracted from the contents of waveform region $\{a\}$ and stored in waveform region $\{a\}$. In next step B27, the GCR signal $Y_6$ obtained by the sixth extraction is extracted into the output waveform memory 20, then added to the contents of waveform region $\{b\}$ and stored in waveform region {b}. In step B28, the GCR signal $Y_7$ obtained by the seventh extraction is extracted into the output waveform memory 20, then subtracted from the contents of waveform region {b} and stored in waveform region {b}. In the following step B29, the GCR signal $Y_8$ obtained by the eighth extraction is extracted into the output waveform memory 20, then subtracted from the contents of waveform region {a} amd stored in waveform region {b}. As a result, the contents indicated by equations (21) and (22) below, respectively, are stored in waveform regions {a} and {b}.

$$\{a\} = (Y_1 - Y_5) + (Y_4 - Y_8) \tag{21}$$

$$\{b\} = (Y_3 - Y_7) + (Y_6 - Y_2) \tag{22}$$

Next, addition result $\{\alpha\}$ and subtraction result $\{\beta\}$ are found by adding and subtracting the contents of waveform regions {a} and {β}, as shown by equations (23) and (24) below. After this, as shown by equation (25) below, in step B30, the difference $\Delta$ of the absolute values $|\rho\alpha i|$, $|\rho\beta i|$ of the respective sample values is found.

$$\{\alpha\} = \{a\} + \{b\} \tag{23}$$

$$\{\beta\} = \{a\} - \{b\} \tag{24}$$

$$\Delta = |\rho\alpha i| - |\rho\beta i| \tag{25}$$

Figure 8:
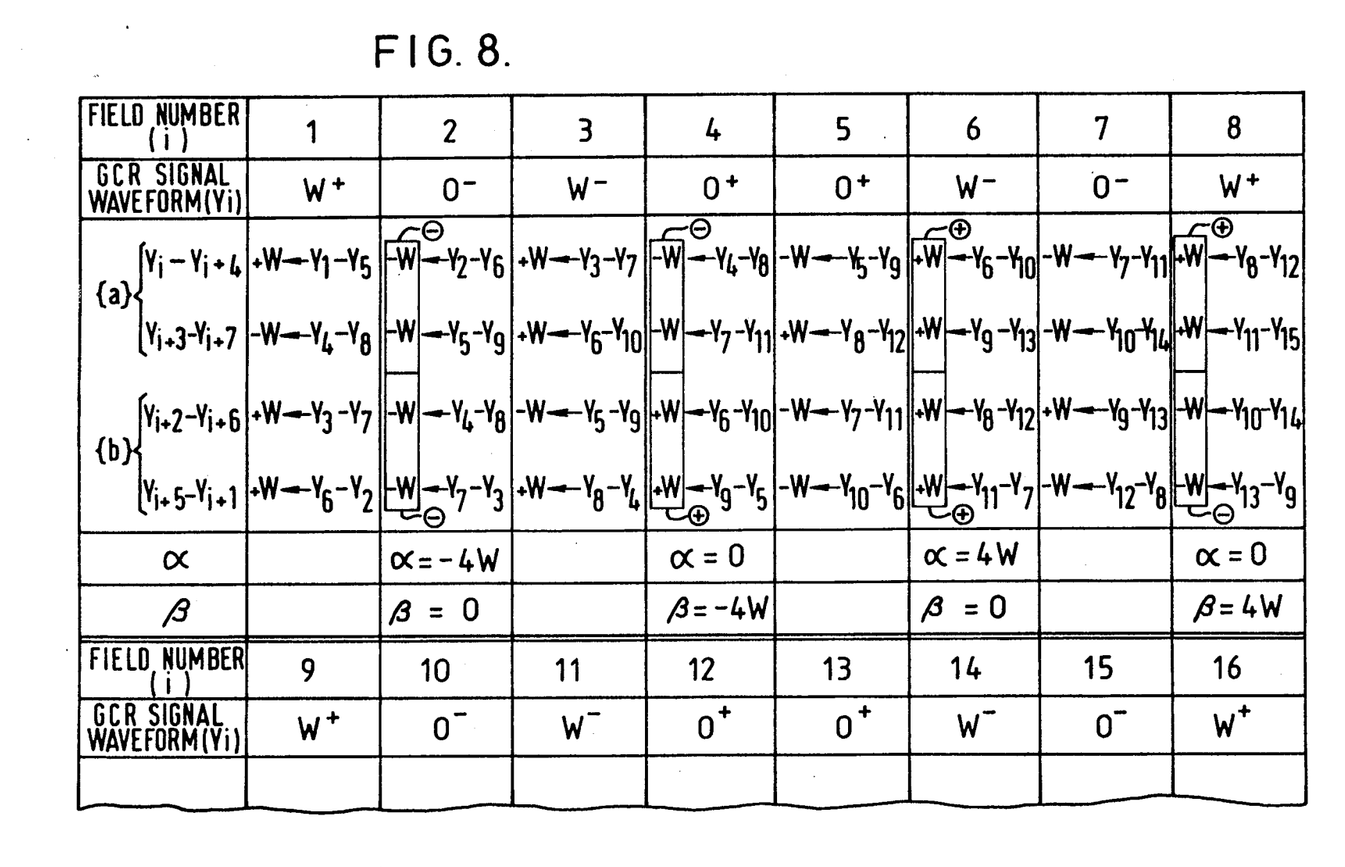
FIG. 8 is a view given in explanation of the operation of FIG. 6.

Here, the addition result $\{\alpha\}$ and subtraction result $\{\beta\}$ represent the positive polarity final GCR signal ($S_{GCR}$) or the negative polarity final GCR signal ($S_{GCR}$). This will be explained using FIG. 8. FIG. 8 shows the results, shown as FIG. 5, of calculating $$Y_i - Y_{i+4} \tag{26}$$

$$Y_{i+3} - Y_{i+7} \tag{27}$$

$$Y_{i+2} - Y_{i+6} \tag{28}$$

$$Y_{i+5} - Y_{i+1} \tag{29}$$

for each field (i). With this representation, it can be seen that the only combinations of the waveform regions {a} and {b} of even fields (2,4,6, and 8, . . . ) are: (−2W, −2W), (−2W, +2W), (+2W, +2W), and (+2W, −2W). As shown by equations (23) and (24), one of the addition result $\{\alpha\}$ and subtraction result $\{\beta\}$ of the waveforms {a} and {b} will therefore be ±4W (= ±$S_{GCR}$), while the other is 0. In step B31, the microprocessor 17 uses the calculation result $\Delta$ of equation (25) to decide whether the addition result $\{\alpha\}$ is ±4W or the subtraction result $\{\beta\}$ is ±4W. Next, in step B32, if $\Delta > 0$, i.e., if the addition result $\{\alpha\}$ is ±4W, the microprocessor 17 decides whether $\rho\alpha i$ is positive or not. In step B34, if it is positive, it takes $\{\alpha\}$ as $S_{GCR}$. In step B35, if it is not positive, it takes $-\{\alpha\}$ as $S_{GCR}$. In the same way, in step B33, if $\Delta$ is not >0, it decides whether $\rho\beta i$ is positive or not. In step B36, if it is positive, it takes $\{\beta\}$ as $S_{GCR}$. In step B37, if it is not positive, it takes $-\{\beta\}$ as $S_{GCR}$.

Accordingly, with this system, the waveform extraction can be performed by detecting 281H.

Figure 9:
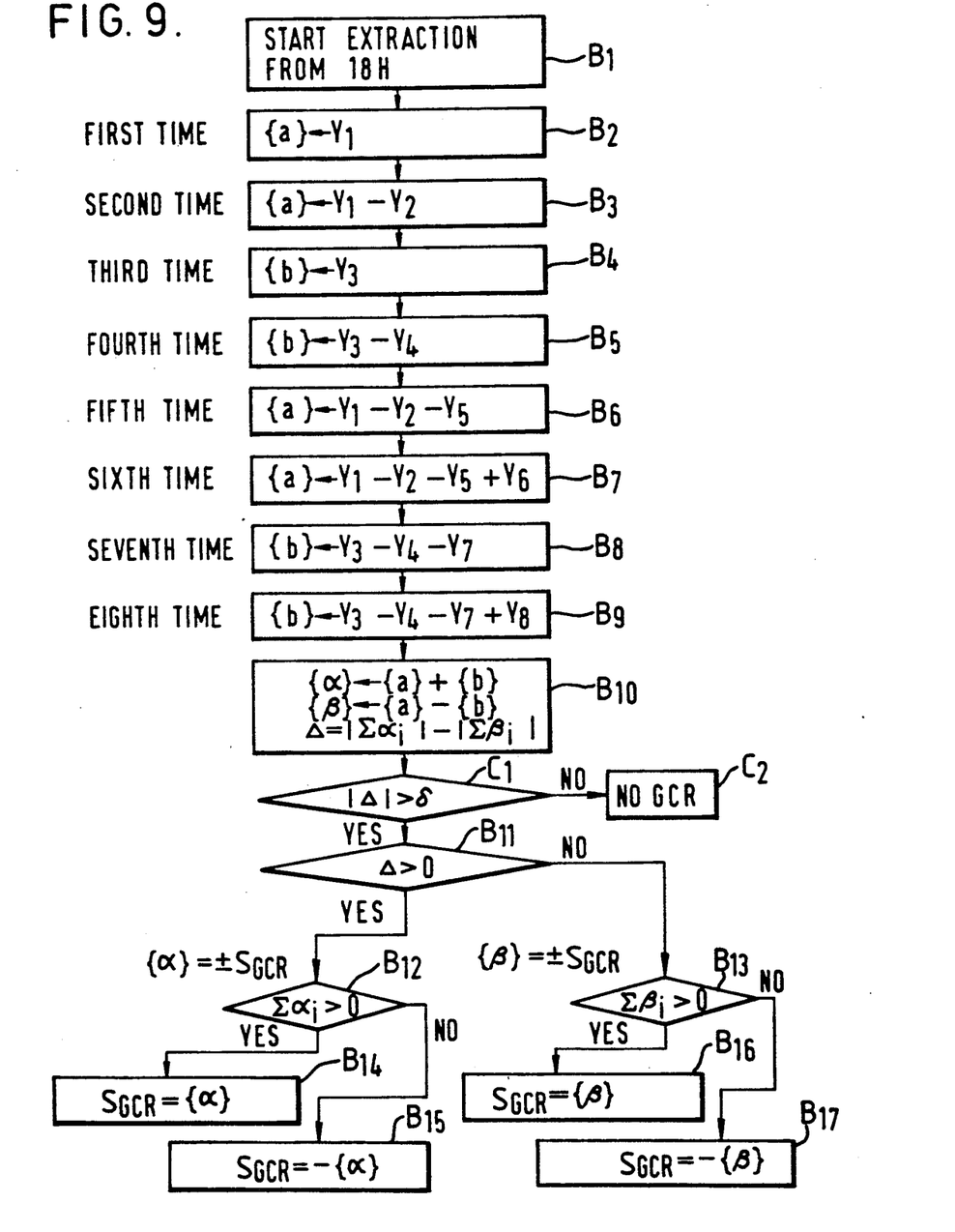
FIG. 9 is a detailed flow-chart showing the operating sequence of output GCR waveform extraction and 8-field sequence calculation step of a third embodiment of the invention.

FIG. 9 is a flow chart showing the operating sequence of a third embodiment of the present invention. In the foregoing embodiments, the case was described in which the calculation algorithm to find the final GCR signal ($S_{GCR}$) was executed irrespective of whether or not a GCR signal was inserted in the video signal. In contrast, in the third embodiment, it is ascertained whether or not a GCR signal has been inserted, and if it has not been inserted, the calculation algorithm is stopped. In order to achieve this object, in FIG. 9, a decision step C1 and a result step C2 are inserted between step B10 and B11 of FIG. 3.

Specifically, in the case where a prescribed 8-field sequence GCR signal is inserted at 18H and 281H, one of the addition result $\{\alpha\}$ and the subtraction result $\{\beta\}$ is $\pm S_{GCR}$, and the other is 0. In step C1, it is therefore ascertained whether or not $|\Delta|$ larger than a specified value $\delta$. If it is larger, it is concluded that a GCR signal is present, and control passes to step B11 so that processing is continued as before. If it is smaller than $\delta$, in step C2, it is concluded that no GCR signal is present, and the calculation algorithm is terminated.

As a result, with such a configuration, the calculation algorithm is terminated if there is no GCR signal, so a spurious operation resulting from no GCR signal being present is prevented. This modification can of course also be applied to the second embodiment described above.

Numerous other modifications and variations of the present invention are possible in light of the above teachings. It is therefore to be understand that, within the scope of the appended claims, the present invention can be practiced in a manner other than as specifically described herein.

For instance, in the above embodiments, the case is described in which the signal on the input side of the ghost cancelling system is input to line detection circuit 31 and 41. However, it would alternatively be possible for the signal on the output side of the ghost cancelling system, that has been subjected to ghost cancel processing, to be input thereto. Also, the present invention can of course be applied to a system wherein the final GCR signal ($S_{GCR}$) is obtained with a reduced noise signal by repeated performance of the calculation between the 8 fields.

What is claimed is:

1. A ghost cancelling system wherein a ghost signal is cancelled from a video signal using a reference signal of the 8-field sequence type comprising:

a transversal filter having a plurality of taps with coefficients which are adjustable;

a line detector for detecting a horizontal scanning line in which said reference signal is inserted from a signal at an input portion of said transversal filter;

a reference signal extractor for extracting said reference signal over 8 fields, starting with said horizontal scanning line which is detected by said like line detector;

a reference signal calculator for finding a final reference signal corresponding to said 8 fields reference signals which are extracted by said reference signal extractor, using a specified calculation algorithm;

a ghost detection means for detecting said ghost signal using said final reference signal calculated by said reference signal calculator; and a coefficient calculation means for calculating said tap coefficients of said transversal filter using a detection output of said ghost detection means.

2. A system according to claim 1, further including a clock generating circuit for generating a clock CK of a period T.

3. A system according to claim 1, wherein said line detector detects a horizontal scanning line in which said reference signal is inserted, in an odd-numbered field.

4. A system according to claim 1, wherein said reference signal calculator further including a calculating means and a signal output means, wherein the calculating means performs the calculation indicated by the following equations $$a = (Y_1 - Y_5) + (Y_6 - Y_2)$$

$$b = (Y_3 - Y_7) + (Y_8 - Y_4)$$

$$\alpha = a + b$$

$$\beta = a - b$$

$$\Delta = \alpha - \beta$$

Where $Y_1$ to $Y_8$ are respectively said first to eighth extraction reference signals, the signal output means outputs said final reference signal in accordance with the polarities of the $\Delta$ and $\alpha, \beta$.

5. A system according to claim 1, wherein said line detector detects a horizontal scanning line in which said reference signal is inserted, in an even-numbered field.

6. A system according to claim 5, wherein said reference signal calculator further includes a calculating means and a signal output means, wherein the calculating means performs the calculation indicated by the following equations:

$$a = (Y_1 - Y_5) + (Y_4 - Y_8)$$

$$b = (Y_3 - Y_7) + (Y_6 - Y_2)$$

$$\alpha = a + b$$

$$\beta = a - b$$

$$\Delta = \alpha - \beta$$

where $Y_1$ to $Y_8$ are respectively said first to eighth extraction reference signals, the signal output means outputs said final reference signals in accordance with the polarities of the $\Delta$ and $\alpha, \beta$.

7. A system according to claim 1, further including an analog/digital conversion circuit for converting said video signal into a digital signal and supplying the converted signal to said transversal filter.

8. A system according to claim 1, wherein said coefficient calculation means corrects said tap coefficients incrementally.

9. A method for controlling a ghost cancelling system having a transversal filter comprising:
   cancelling a ghost signal utilizing tap coefficients obtained from a video signal containing a reference signal of the 8-field sequence type, including the steps of:
   detecting a horizontal scanning line containing said reference signal of the 8-field sequence type;
   extracting said reference signal of the 8-field sequence type from said detected horizontal scanning line;
   calculating a final reference signal corresponding to said reference signal of the 8-field sequence type;
   distinguishing said ghost signal using said final reference signal; and
   correcting said tap coefficients in response to said distinguished ghost signal.

* * * * *